United States Patent
Ebadian et al.

(10) Patent No.: US 11,090,134 B2
(45) Date of Patent: Aug. 17, 2021

(54) ASSEMBLY FOR FABRICATING DENTAL VENEER

(71) Applicants: Mohammad Taghi Ebadian, Surrey (GB); Seyed Omid Dianat, Fairfax, VA (US)

(72) Inventors: Mohammad Taghi Ebadian, Surrey (GB); Seyed Omid Dianat, Fairfax, VA (US)

( * ) Notice: Subject to any disclaimer, the term of this patent is extended or adjusted under 35 U.S.C. 154(b) by 0 days.

(21) Appl. No.: 17/148,570

(22) Filed: Jan. 14, 2021

(65) Prior Publication Data

US 2021/0128271 A1    May 6, 2021

Related U.S. Application Data

(60) Provisional application No. 63/061,473, filed on Aug. 5, 2020.

(51) Int. Cl.
| | |
|---|---|
| *A61C 5/20* | (2017.01) |
| *A61C 17/10* | (2006.01) |
| *A61C 19/00* | (2006.01) |
| *A61C 13/087* | (2006.01) |
| *A61C 5/30* | (2017.01) |
| *A61C 13/00* | (2006.01) |

(52) U.S. Cl.
CPC ............. *A61C 5/20* (2017.02); *A61C 5/30* (2017.02); *A61C 13/0006* (2013.01); *A61C 13/087* (2013.01); *A61C 17/10* (2019.05); *A61C 19/00* (2013.01)

(58) Field of Classification Search
CPC .. A61C 5/20; A61C 5/30; A61C 5/007; A61C 5/60; A61C 5/90; A61C 5/82; A61C 5/80; A61C 7/08; A61C 7/146; A61C 13/0006; A61C 13/087; A61C 19/00
See application file for complete search history.

(56) References Cited

U.S. PATENT DOCUMENTS

| | | | | |
|---|---|---|---|---|
| 4,226,593 | A * | 10/1980 | Cohen .................. | A61C 5/20 433/226 |
| 2007/0292821 | A1* | 12/2007 | De Vreese ............ | A61C 5/77 433/195 |
| 2016/0228214 | A1* | 8/2016 | Sachdeva ............. | G05B 19/4097 |
| 2019/0298489 | A1* | 10/2019 | Dingeldein .......... | A61C 5/00 |
| 2020/0222158 | A1* | 7/2020 | Coreil .................. | A61C 13/2656 |
| 2020/0345459 | A1* | 11/2020 | Schueller ............. | A61C 7/146 |

* cited by examiner

*Primary Examiner* — Jacqueline T Johanas
*Assistant Examiner* — Shannel Nicole Belk
(74) *Attorney, Agent, or Firm* — Barry Choobin; Patent 360

(57) ABSTRACT

Disclosed is an assembly and method for fabricating a dental prosthesis, such as composite veneer directly in a mouth. The assembly includes a base that can be worn in a mouth, the base configured to fit around a base line. The base forms an enclosed body around teeth to be treated. The assembly further comprises a handle configured to secure to the base. The handle comprises an orienting arm that carrier a shell attach to its tip. The base and the handle are configured such as when the handle is secured to the base, the shell is placed over the tooth in a predetermined position.

20 Claims, 4 Drawing Sheets

ASSEMBLY FOR FABRICATING DENTAL VENEER

CROSS-REFERENCE TO RELATED APPLICATIONS

This application claims priority to a U.S. provisional patent application Ser. No. 63/061,473, filed on Aug. 5, 2020, which is incorporated herein by reference in its entirety.

FIELD OF THE INVENTION

The present invention relates to the field of restorative (operative) dentistry and prosthodontics, and more particularly, the present invention relates to an assembly for fabricating a composite veneer directly in a mouth.

BACKGROUND OF THE INVENTION

Esthetic dentistry refers to dental work that improves the appearance of teeth and gums. Esthetic dentistry is a multi-billion-dollar industry and exponentially growing every year. White and even teeth are universally considered attractive and desired. However, not everyone is born with even teeth. Moreover, deformity of one or more teeth can occur due to accidents. Additionally, the color and shape of the teeth get affected with age. Teeth whitening has become a common dental procedure that involves bleaching the teeth to lighten the color. However, shaping the teeth to the original state or correcting any deformity can be a complex procedure and generally involves specialized skills.

Veneers are a type of dental prosthetics that can be implanted over a tooth. Veneers are even tooth-shaped mass that when bonded over a tooth hides the tooth. Veneers can hide most types of tooth's deformity and discoloration. The shape and size of veneers can be customized based on the smile of each patient. There are two main types of materials used to manufacture the veneers: composite and porcelain. Composite veneers can be directly fabricated in the mouth using composite resins. Basically, direct composite veneers are more conservative, easier to implement and less steps to follow. However, they need a lot of experience and skill. Broadly, the process of directly fabricating a composite veneer in mouth includes stone casting, wax-up, and mock-up stages and then fabrication of final restoration. One or more of these steps can be manual or digital. The mock-up stage includes preparing a mock-up tray from the wax-up, wherein the mock-up tray is like a mold for fabricating the composite veneers. The molds in the mock-up tray can be filled with the composite resin and press-fit onto the teeth. The composite resin takes the shape of the mold and bonds to the tooth surface. The composite resin can then be cured to form the composite veneers and the excess of material can be trimmed. However, mock-up tray is usually used as temporary restoration till final restorations get ready in the lab. Both direct and indirect conventional techniques are time consuming and require multiple trials.

Therefore, considering the increased use of composite veneers in esthetic dentistry, a need is appreciated for an assembly for fabricating composite veneers faster with more precision and more esthetic.

The term "shell" hereinafter connotes a mold for transferring an ideal shape and contour of a digitally or manually formed wax-up to the oral cavity. The inner side of the shell reflects an ideal form, shape, and contour of the composite veneer. The shell can be fabricated manually or digitally. Moreover, the shells could be fabricated individually for each tooth based on different parameters such as centric occlusion, lateral and protrusive movements, esthetic golden ratios, ideal contour and form, etc. based on the normal anatomical size of ideal teeth or individually customized for each tooth based on a smile design.

SUMMARY OF THE INVENTION

The principal object of the present invention is therefore directed to an assembly for directly fabricating a dental veneer in a mouth.

It is an additional object of the present invention that the assembly can be manufactured using digital dentistry technologies.

It is still an additional object of the present invention that the assembly provides for faster and safer fabrication of the composite dental veneers directly in mouth.

It is a further object of the present invention that the assembly reduces the level of human error in fabricating composite dental veneers directly in mouth.

It is still another object of the present invention that the assembly can be custom made for a patient using digital dentistry technologies.

It is yet another object of the present invention that the assembly is economical to manufacture.

In one aspect, disclosed is an assembly for fabricating composite veneers directly in mouth on one or more teeth. The disclosed assembly comprises a base and a handle. The base includes a first segment and a second segment integrated with the first segment. The first segment having a first end, a second end that is opposite to the first end, and a mid-part between the first end and the second end. The first segment is substantially U-shaped and is dimensioned to fit around the gum line of a dental arch. The mid part of the first segment extends along a teeth line to be treated. For example, the mid part can extend between the terminal teeth of a teeth line to be treated. In case, the incisor teeth have to be treated, the mid part can extend between the terminal canine teeth. The second segment having a first end, a second end opposite the first end, and a mid-part between the first end and the second end. The second segment is substantially U-shaped and is dimensioned to run respective to the teeth line in an occlusal plane. The mid part of the second segment is adjacent to the mid part of the first segment, wherein the mid part of the first segment and the mid part of the second segment forms an enclosed body around the teeth line between the two teeth, the two teeth can be adjacent or distance apart. Moreover, the two teeth can be incisors, canine, premolar, or molar. The disclosed assembly can be used for restoring any tooth including the incisors, canine, premolar, or molar. The first end and the second end of the second segment integrated with the first segment. The mid parts of the first segment and the second segment having a plurality of holes, such as each the first segment and the segment can have at least one hole, wherein the two opposite holes of the first segment and the second segment can be aligned along an axis passing through a tooth to be treated.

In one aspect, the handle is of a U-shaped configuration having a proximal end, a distal end opposite the proximal end, and a mid-part extending between the proximal end and the distal end. Each end of the U-shaped handle having at least one key, wherein the key is configured to engage with a hole of the base for securing the handle to the base. An orienting arm extends from the mid-part of the handle. The tip of the orienting arm can attach a shell, wherein the first segment, the second segment, and the handle are configured such as when the handle is secured to the base, the shell can be placed in a predetermined position over the outer surface of a tooth for fabricating the composite veneer.

In one aspect, the base can be fabricated for an upper dental arch or a lower dental arch or both. Additionally, a single integrated base can be produced for both the upper dental arch and the lower dental arch. Such an integrated base can be provided with a passage of withdrawing mouth secretions.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAIL DESCRIPTIONS OF THE INVENTION

Figure 1:
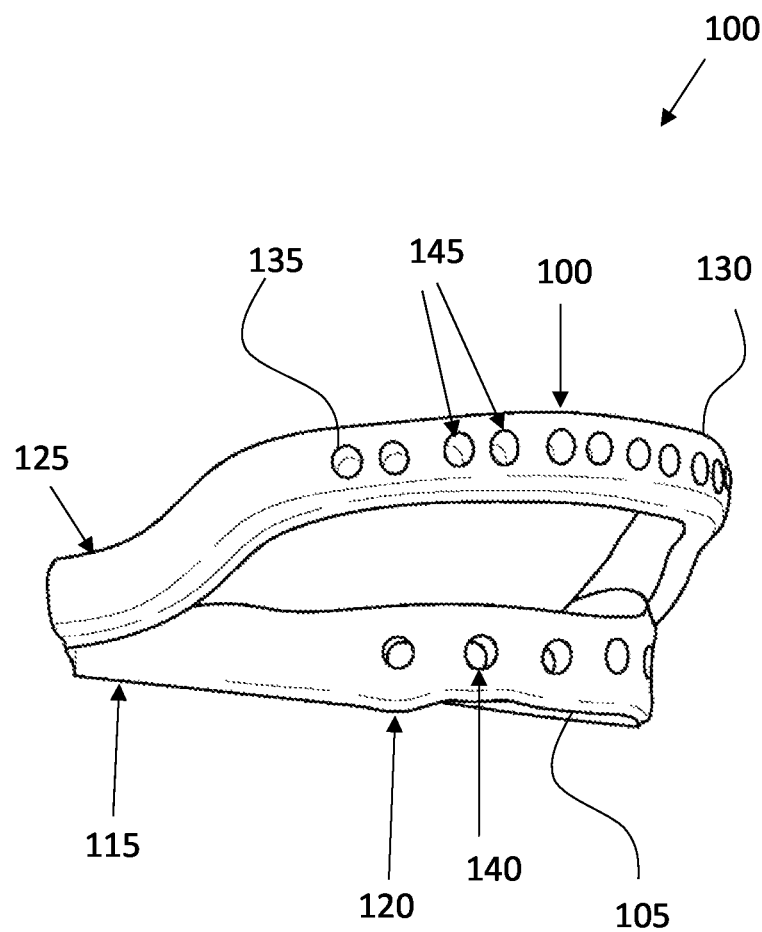
FIG. 1 is a perspective view of an upper arch base, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, the reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Disclosed is an assembly and method of fabricating a dental prosthesis over a tooth. The dental prosthesis can be a composite veneer that can be built over the tooth from composite resins. The composite veneer hides any deformity and discoloration of the tooth. The composite veneer can be prepared from known composite resins. The disclosed assembly and method provide for putting the shell over a tooth in a perfect and predetermined position. The composite resin can then be filled into the shell, wherein the composite resins takes the shape of the shell. The composite resin can then be cured, and any protruding resin can be trimmed from the edges of the shell. The composite resin can be injected into the shell, wherein the shell is fitted over a tooth's surface. The shell can be fabricated manually or digitally. The shells could be fabricated individually for each tooth based on different parameters such as centric occlusion, lateral and protrusive movements, esthetic golden ratios, ideal contour and form, etc. based on the normal anatomical size of ideal teeth or individually customized for each tooth based on a smile design. The disclosed assembly reduces human errors in the process of composite tooth restoration. The disclosed assembly includes a base configured to be worn in the mouth and a handle the attaches to the base, the handle includes the shell. The assembly can be fabricated using conventional molding techniques or digital dentistry techniques.

Referring to FIG. 1 which shows a perspective view of a base according to an exemplary embodiment of the present invention. The base can be designed and fabricated considering the jaws' relationship, arch shape, teeth anatomy, and the number of teeth that are to be treated. The base can be fabricated for the upper arch (upper arch base) or the lower arch (lower arch base). Both the upper arch base and the lower arch base can be simultaneously used for treating teeth of both the upper dental arch and the lower dental arch. The base 100 shown in FIG. 1 is for an upper dental arch of the mouth of a patient. The base 100 can be described as having two segments, the first segment 105 and the second segment 110. The first segment 105 can have a first end 115, a second end opposite the first end, and a mid-part 120 between the first end 115 and the second end. The first segment 105 is substantially U-shaped and is dimensioned to fit around a gum line of a dental arch. The gum line herein refers to the gums above the teeth. The mid-part 120 of the first segment run respective to a teeth line between two teeth. The teeth line herein refers to the order and geometry of the teeth. The two teeth can be adjacent of distance apart. Moreover, the two teeth can be incisors, canine, premolar, or molar. Perhaps, the disclosed assembly can be used for restoring any tooth including the incisors, canine, premolar, or molar The second segment 100 of the base 100 is having a first end 125, a second end that is opposite the first end, and a mid-part 130 between the first end 125 and the opposite second end. The second segment 110 is dimensioned and shaped to run respective to the teeth line in the occlusal plane. The occlusal plane herein refers to an imaginary plane that touches the tip of the teeth. The mid-part 130 of the second segment 110 is shown adjacent to the mid part 120 of the first segment 105. Additionally, the mid-part 130 of the second segment 110 is extended a little further away from the mid part 120 of the first segment 105. The geometry of the mid-part 120 and the mid part 130 corresponds to the geometry of the jaw. While the geometry of the first segment can be commensurate with the geometry of the gum line, the geometry of the second segment can be commensurate with the geometry of the teeth line. The mid-part 120 of the first segment 105 and the mid-part 130 of the second segment 110 forms an enclosed body around a portion of the teeth line, wherein the portion of the teeth line extends between two teeth. The first end 125 and the second end of the second segment 110 are integrated with the first segment 105. The height of the base can be the combined heights of the first segment and the second segment. The teeth line enclosed by the disclosed base, including the terminal teeth, is accessible for treatment.

Furthermore, can be seen in FIG. 1 is the first segment 105 and the second segment 110 having a plurality of holes or seats 135. The holes can be a part of a mating structure for fastening two objects. Specifically, the mid-parts of the two segments can include holes 135. The second segment 110 is having double the holes of first segment 105. One hole of the first segment 105 and the two holes of the second segment 110 are aligned with respect to a tooth. For example, FIG. 1 shows a hole 140 of the first segment 105 aligned with the two holes 145 of the second segment 110. The hole 140 and the two holes 145 are aligned along a common axis that passes through a tooth. More specifically, the axis extends along the length of the tooth. Still, more specifically, the axis extends perpendicular to the teeth line or the gum line. It is to be understood that FIG. 1 illustrates a base for the upper dental arch, similar base can be fabricated for the lower dental arch. Additionally, FIG. 1 shows three mating members/holes/seats for one tooth, each segment should have at least one hole relative to a tooth. For example, when only one tooth must be treated, at least one hole can be provided in both segments relative to the position of the tooth to be treated. When two teeth must be treated, at least two holes must be provided in each segment.

Figure 4:
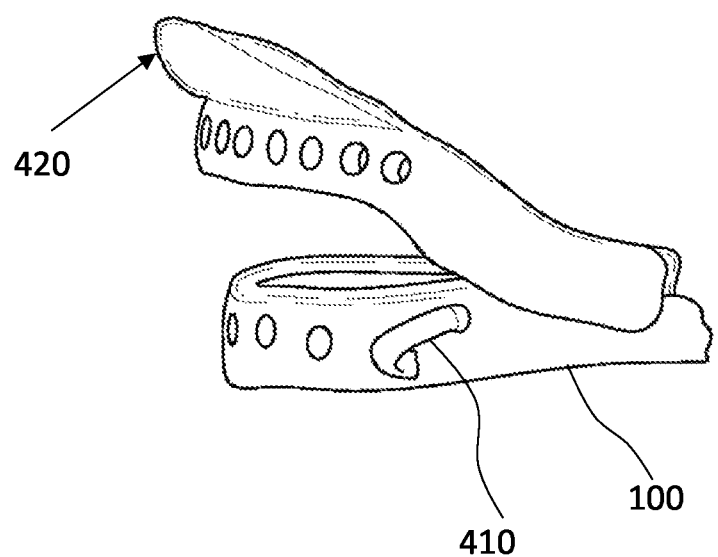
FIG. 4 shows another embodiment of the upper arch base having suction connection and lip retraction extension, according to an exemplary embodiment of the present invention.

In one exemplary embodiment, the base can have an attachment for the saliva ejector (suction) connection, shown as element 410 in FIG. 4. Moreover, the base can also be provided with an optional lip retraction extension or flap 420 (shown in FIG. 4). The base can be fabricated based on the geometry of the jaws of a patient i.e. the base can be customized for every patient. Alternatively, the base can be provided prefabricated in multiple average sizes. The average sizes can be based on shapes and sizes that are common for most patients. The prefabricated base can be provided in three different sizes including small, medium, and large that can fit on most dental arches.

Figure 2:
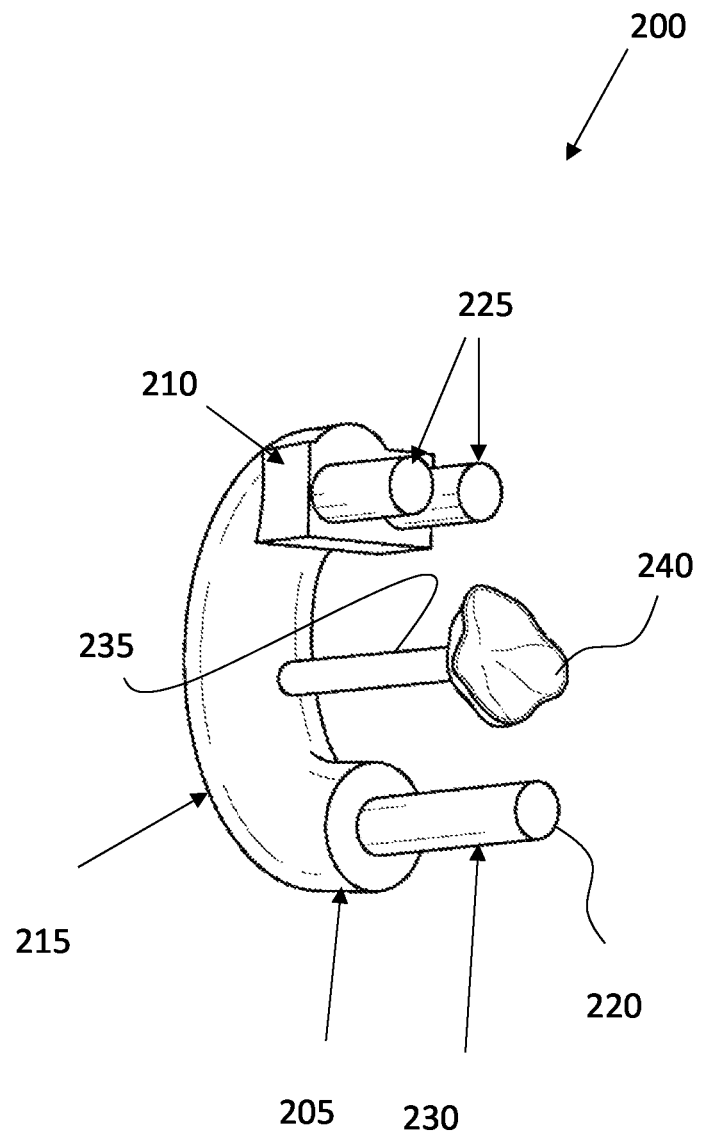
FIG. 2 shows a handle, according to an exemplary embodiment of the present invention.

Referring to FIG. 2 which shows a perspective view of a handle 200. The handle 200 is shown to be of a U-shaped configuration having two opposite index arms and a curved bottom. The handle having a proximal end 205, a distal end 210, and a mid-part 215. Keys 220 extends from the first end 205 and the second end 210. One key extends perpendicularly from the first end 205, while two keys are shown to extend from the second end 210. The number and position of keys correspond to the number and position of holes in the base 100. The keys 220 are configured to engage with the holes 135 of the base for securing the handle 200 to the base 100. For example, the hole 140 corresponds to the key 230 and the two holes 145 respectively correspond to the two keys 225. The keys can be the second part of the mating member and can be any mating or fastening member that can engage with the mating member of the base for securing the handle to the base. Although two holes and two keys provide for securing the handle to the base, the three keys can impart better stability to the handle and prevent any undesirable rocking motions during the dental procedure.

FIG. 2 also shows an orienting arm 235 that extends from the mid-part 215 of the handle 200. The orienting arm 235 extends in a direction of the opposite index arms of the handle. On the tip of the orienting arm 235 can be seen a shell 240. The orienting arm 235 can attach the shell 240 for positioning the shell on the tooth's surface. The orienting arm 235 provides for the correct positioning of the shell over a tooth to be treated. The handle 200 including the orienting arm 235 can be customized for each patient. Alternatively, the handle 200, excluding the orienting arm 235, can be prefabricated like the base. The handle 200 can be prefabricated based on average teeth and arch sizes.

Figure 3:
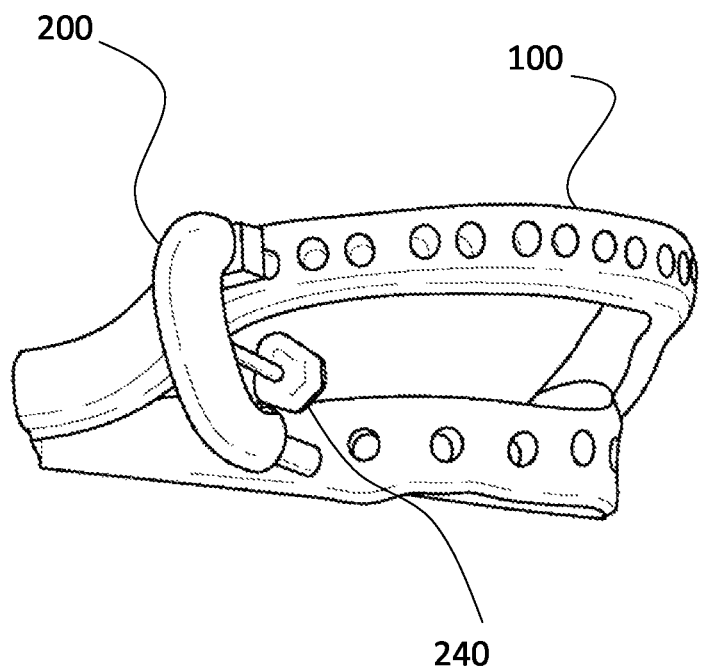
FIG. 3 shows the handle of FIG. 2 secured to the upper arch base shown in FIG. 1, according to an exemplary embodiment of the present invention.

Referring to FIG. 3 which shows the handle 200 secured to the base 100 and the shell 240 is shown to be positioned over an outer surface of a tooth (not shown). The base including the two segments and the handle including the orienting arm are configured such as when the handle is secured to the base, the shell can be automatically placed over a tooth to be treated in a desired or predetermined position. The handle is secured by the insertion of the keys in the holes of the base. Once the keys are properly engaged with the holes, the shell should be in its desired/predetermined position. For building the composite veneer, the composite resin can be filled onto the shell before positing the shell over a tooth. Alternatively, the composite resin can be injected into the shell that is perfectly positioned over the tooth. Briefly, first the base is secured to the dental arch. Once the base fits properly, one or more handles depending upon the number of teeth to be treated can be attached one-by-one. In one case, a test handle with a shell can also be prepared to verify the correct installation of the base. For example, upon securing the base to the dental arch, the test handle can be secured to the base. If the test shell is in the predetermined position over a tooth's surface, the test handle can be removed. However, if the shell does not position correctly, the handle can be removed, and the base can be readjusted. Upon completion of the procedure, the assembly including the shell can be removed.

In one exemplary embodiment, the shell can be a negative replica of an ideally waxed-up tooth surface (manually or digitally) which needs to be restored. The inner part of the shell reflects the form, shape, and contour of the desired tooth shape. The shell can be prefabricated based on the normal anatomical size of ideal teeth or individually customized for each tooth based on a smile design. In cases in which the disclosed assembly must be fully customized for a patient, the fabrication process can be done through conventional, digital, or hybrid approaches. In a conventional fabrication process for the disclosed assembly, first, an Intra-oral impression of both dental arches and bite registration can be taken. The dental cast fabrication and mounting the casts in proper position can be based on the ideal required mouth opening. The teeth wax-up can be based on esthetic (golden proportion and other important variables) and functional factors.

For the manual shell fabrication, the base can be fabricated. The handle can then be fabricated and attached to the base. Thereafter, the shell can be attached to the orienting arm. It is preferable to use the digital dentistry techniques for the fabrication of the disclosed assembly. First, the intraoral digital scanning of both arches and digital bite-registration can be taken. Standard intraoral and extraoral photographs can be taken. The 3D scan and photographs can be then be subjected to processing using planning software. Using the software, the assembly can be designed and 3D-printed in a lab. Similarly, the shell can also be designed and fabricated in a lab. Shells can be fabricated individually for each tooth based on different parameters such as centric occlusion, lateral and protrusive movements, esthetic golden ratios, ideal contour, and form, etc. The shell can then be attached to the handle. In the hybrid approach, after designing and printing the assembly parts, its accuracy can be checked on dental casts and minor adjustments can be made for the desired precision and accuracy.

The disclosed method is advantageous over any conventional direct composite or indirect ceramic restoration. The disclosed method provides for increased precision and accuracy of direct restorations regarding the anatomic form, size, shape, contours, and ratios. By using the disclosed method, all esthetic and functional elements related to the shape, size, and form of a crown can be considered and designed in a lab or by virtual planning software, then reflected in the fabricated shell and transfer with the proposed assembly to the specific tooth inside the oral cavity. The disclosed assembly and method are fully in line with the concept of minimally invasive dentistry. This disclosed method results in minimum tooth structure damage and maximum tooth preservation compared to indirect esthetic techniques. Reduced treatment cost and chair time are other advantages. Additionally, the disclosed assembly and method provides for using the layering technique (applying different layers of dentin and enamel composites).

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An assembly for fabricating a dental prosthesis, the assembly comprising:
    a base, the base comprising:
        a first segment, the first segment having a first end, a second end opposite the first end, and a mid-part between the first end and the second end, the first segment dimensioned to surround a facial gum line of a dental arch, the mid-part of the first segment configured to extend along a subject teeth line, the subject teeth line includes one or more teeth to be treated;
        a second segment, the second segment having a first end, a second end opposite the first end, and a mid-part between the first end and the second end, the second segment dimensioned to run respective to the teeth line in an occlusal plane, the mid-part of the second segment is adjacent to the mid-part of the first segment, wherein the mid-part of the first segment and the mid-part of the second segment forms an enclosed body around the subject teeth line, the first end and the second end of the second segment are integrated with the first segment,
        wherein the mid-part of the first segment having at least one female mating member, the mid-part of the second segment having at least one female mating member, wherein the at least one female mating member of the first segment and the at least one female mating member of the second segments are aligned along an axis passing through a tooth to be treated; and
    a handle, the handle comprising:
        a proximal end, a distal end, and a mid-part between the proximal end and the distal end, each the proximal end and the distal end having a male mating member configured to engage with the at least one female mating member of the first segment and the second segment,
        an orienting arm that extends from the mid-part of the handle, the orienting arm having a shell attached to an end, the shell configured to position over the tooth,
        wherein the first segment, the second segment, and the orienting arm are configured such as when the handle is secured to the base, the shell is placed over the tooth in a predetermined position.

2. The assembly according to claim 1, wherein the axis extends along a length of the tooth.

3. The assembly according to claim 1, wherein the axis extends perpendicular to the gum line or the teeth line.

4. The assembly according to claim 1, wherein the at least one female mating member of the first segment and the at least one female mating member of the second segment are holes, the male mating member of the handle is a key, keys of the proximal end and the distal end configured to engage to the holes in the first segment and the second segment.

5. The assembly according to claim 4, wherein for each tooth of the subject gum line to be treated, the first segment comprising one hole and the second segment comprises two holes, the proximal end of the handle having one key that corresponds to the one hole of the first segment, the distal end of the handle having two keys that correspond to the two holes of the second segment.

6. The assembly according to claim 1, wherein the base is configured for an upper dental arch.

7. The assembly according to claim 1, wherein the base is configured for a lower dental arch.

8. The assembly according to claim 1, wherein the base further comprises a flap configured to keep an adjacent lip in a retracted position.

9. The assembly according to claim 1, wherein the base further comprises a passage for sucking saliva.

10. The assembly according to claim 1, wherein the subject teeth line is accessible for treatment.

11. The assembly according to claim 1, wherein the shell is configured to be filled with a composite resin for forming the composite veneer.

12. The assembly according to claim 1, wherein the handle is of a U-shape configuration.

13. The assembly according to claim 1, wherein the geometry of the first segment is commensurate with the geometry of the gum line, and the geometry of the segment is commensurate with the geometry of the subject teeth line.

14. A method for fabricating a dental prosthesis, the method comprises:

providing an assembly, the assembly comprises:
   a base, the base comprising:
      a first segment, the first segment having a first end, a second end opposite the first end, and a mid-part between the first end and the second end, the first segment dimensioned to surround a facial gum line of a dental arch, the mid-part of the first segment configured to extend along a subject teeth line, the subject teeth line includes one or more teeth to be treated,
      a second segment, the second segment having a first end, a second end opposite the first end, and a mid-part between the first end and the second end, the second segment dimensioned to run respective to the teeth line in an occlusal plane, the mid-part of the second segment is adjacent to the mid-part of the first segment, wherein the mid-part of the first segment and the mid-part of the second segment forms an enclosed body around the subject teeth line, the first end and the second end of the second segment are integrated with the first segment,
      wherein the mid-part of the first segment having at least one female mating member, the mid-part of the second segment having at least one female mating member, wherein the at least one female mating member of the first segment and the at least one female mating member of the second segments are aligned along an axis passing through a tooth to be treated, and
   one or more handles, each handle comprising:
      a proximal end, a distal end, and a mid-part between the proximal end and the distal end, each the proximal end and the distal end having a male mating member configured to engage with the at least one female mating member of the first segment and the second segment,
      an orienting arm that extends from the mid-part of the handle, the orienting arm having a shell at a tip for positioning over the tooth,
      wherein the first segment, the second segment, and the orienting arm are configured such as when the handle is secured to the base, the shell is placed over the tooth in a predetermined position;
   securing the base in an oral cavity of a patient; and
   securing at least one of the one or more handle to the base.

15. The method according to claim 14, wherein the base is secured to the gum line of an upper dental arch.

16. The method according to claim 14, wherein the base is secured to the gum line of a lower dental arch.

17. The method according to claim 14, wherein the base is secured to gum lines of both an upper dental arch and a lower dental arch.

18. The method according to claim 14, wherein for each tooth of the subject gum line to be treated, the first segment comprising one hole and the second segment comprises two holes, the proximal end of the handle having one key that corresponds to the one hole of the first segment, the distal end of the handle having two keys that correspond to the two holes of the second segment.

19. The method according to claim 14, wherein the method further comprises the steps of:
   upon attaching the at least one handle, injecting a composite resin into the shell; and
   curing the composite resin.

20. The method according to claim 14, wherein the subject teeth line includes teeth selected from a group consisting of incisors, canine, pre-molar, molar, or a combination thereof.

* * * * *